United States Patent [19]
Tamaki et al.

[11] Patent Number: 5,485,375
[45] Date of Patent: Jan. 16, 1996

[54] PROTECTING DEVICE OF ELECTROMOBILE

[75] Inventors: Satoshi Tamaki, Hirakata; Yasufumi Ikkai, Kobe; Yasuhiro Kondo, Hirakata, all of Japan

[73] Assignee: Matsushita Electric Industrial Co., Ltd., Osaka, Japan

[21] Appl. No.: 307,052

[22] Filed: Sep. 16, 1994

[30] Foreign Application Priority Data

Sep. 17, 1993 [JP] Japan ................... 5-232079

[51] Int. Cl.$^6$ ........................................ B60L 3/04
[52] U.S. Cl. .............. 364/424.03; 318/563; 180/65.8
[58] Field of Search ................ 364/424.01, 424.03, 364/571.01, 571.02, 184; 318/587, 563, 611, 624, 672, 702, 139; 180/65.1, 65.3, 65.8

[56] References Cited

U.S. PATENT DOCUMENTS

| | | | |
|---|---|---|---|
| 3,866,702 | 2/1975 | Eastham | 180/65 R |
| 4,090,114 | 5/1978 | Thompson | 318/139 |
| 4,256,196 | 3/1981 | Waddington | 180/65 E |
| 5,161,634 | 11/1992 | Ichihara et al. | 180/179 |
| 5,294,871 | 3/1994 | Imaseki | 318/139 |
| 5,345,155 | 9/1994 | Masaki et al. | 318/138 |
| 5,357,181 | 10/1994 | Mutoh et al. | 318/139 |

*Primary Examiner*—Michael Zanelli
*Attorney, Agent, or Firm*—Wenderoth, Lind & Ponack

[57] ABSTRACT

An electromobile includes a control device which, receiving as inputs a speed command signal outputted from an accelerator sensor and a present motor speed signal outputted from an encoder, calculates a torque command current corresponding to a difference between the inputs, to thereby control the motor in accordance with the torque command current. A protecting device is provided with includes an accelerator switch for switching an outputting state thereof depending on a presence/absence of the control device of the speed command signal. The control device an abnormality detecting device detects an abnormal state in which the torque command current assumes a value to rotate the motor white the output signal of the accelerator switch indicates that the speed command signal is not generated, and an abnormality processing device controls the motor for a safe operation response to an abnormality output from the abnormality detecting device.

4 Claims, 4 Drawing Sheets

PROTECTING DEVICE OF ELECTROMOBILE

BACKGROUND OF THE INVENTION

The present invention relates to a protecting device for a fail-safe operation in the case of a failure, an accident, etc. in an electromobile incorporating a synchronous motor therein as a power source.

The development of electromobiles has rapidly progressed as a countermeasure against environmental problems, and the direct current motor power source of an increased number of the newer electromobiles has been replaced with an alternating current motor due to its inherent advantages such as ease of maintenance and the like. Particularly, a synchronous motor using a magnet as a rotor is highly efficient, and is therefore especially suited for use in electromobiles. The synchronous motor of this kind has conventionally been widely used in factory automation or industrial fields, and the basic controlling system of the synchronous motor used in electromobiles is almost the same as that used in factory automation or industrial fields.

However, because of the undeniable fact that human lives are exposed to a high risk in vehicles, it is necessary to take all possible fail-safe measures.

FIG. 4 is a circuit diagram of an electromobile in one proposed example, in which reference numerals represent respectively: 1 a control device; 2 a PWM (pulse width modulation) inverter; 3 a motor such as a synchronous motor or the like; 4 an encoder coupled to a rotary shaft of the motor 3; 5, 6 current detectors for detecting a phase current of the motor 3; 7 a primary battery for supplying electricity to the motor 3 via the PWM inverter 2; and 8 a control battery for supplying a control current to the control device 1 via a key switch 9.

When a driver turns on the key switch 9 of the electromobile, the control device 1 is connected to the motor 3 via the PWM inverter 2, so that a current to the motor 3 is commutated at a suitable timing. In this case, the control device 1 controls the PWM inverter 2 so as to a supply a torque current to the motor 3. The motor 3 rotates when it receives electricity from the primary battery 7 of $V_{Batt}$ voltage via the PWM inverter 2. The positional data of a rotor of the motor 3 and the speed of the motor 3 are sent back to the control device 1 from the encoder 4 coupled to the rotary shaft of the motor 3. At the same time, the phase current of the motor 3 is detected with the use of the current detectors 5, 6 or the like and fed back to the control device 1. The control device 1 properly controls the rotation of the motor 3 based on the above fed-back signals and signals from an accelerator sensor, etc.

In the electromobile, outputs of the accelerator sensor interlocking with an accelerator pedal, namely, accelerator sensor signals which rise, for example, linearly in proportion to the opening degree of the accelerator and, output signals of the encoder which indicate the present rotating speed of the motor are inputted to the control device 1. The control device 1 in turn detects the difference between the accelerator sensor signal instructing the required rotating speed of the motor 3 and the output signal from the encoder 4 indicating the present rotating speed of the motor 3, to thereby, effect control by supplying a torque current to the motor 3, corresponding to the detected difference. The accelerator sensor signal and the torque current obtained by calculations as above are monitored for a fail-safe operation. The torque current $I_q$ to be outputted when the accelerator sensor signal is zero cannot hold $I_q>0$. Therefore if the condition satisfying $I_q>0$ arises it is considered abnormal, necessitating a safety control. To secure safety, it is desirable to stop the control of the motor 3.

SUMMARY OF THE INVENTION

The object of the present invention is therefore to provide a protecting device of an electromobile which stops the control of a motor to thereby secure safety in the case of an abnormality wherein in which a torque current rotating the motor is supplied to the motor even though an accelerator sensor signal is zero.

In accomplishing these and other objects, according to one aspect of the present invention, there is provided a protecting device of an electromobile designed to protect the electromobile having a control device which, receiving inputs of a speed command signal outputted from an accelerator sensor and a signal of a present speed of a motor outputted from an encoder, calculates a torque command current corresponding to the difference of the inputs, to thereby control the motor in accordance with the torque command current, the protecting device comprising:
an accelerator switch for switching an outputting state depending on a presence/absence of the generation of the speed command signal;
the control device comprising:
an abnormality detecting means for detecting an abnormal state in which the torque command current assumes a value to rotate the motor while the output signal of the accelerator switch indicates that the speed command signal is not generated; and
an abnormality processing means for controlling the motor to be safe in response to an abnormality detecting output of the abnormality detecting means.

BRIEF DESCRIPTION OF THE DRAWINGS

These and other objects and features of the present invention will become clear from the following description taken in conjunction with the preferred embodiment thereof with reference to the accompanying drawings, in which.

DETAILED DESCRIPTION OF THE PREFERRED EMBODIMENT

Figure 1:
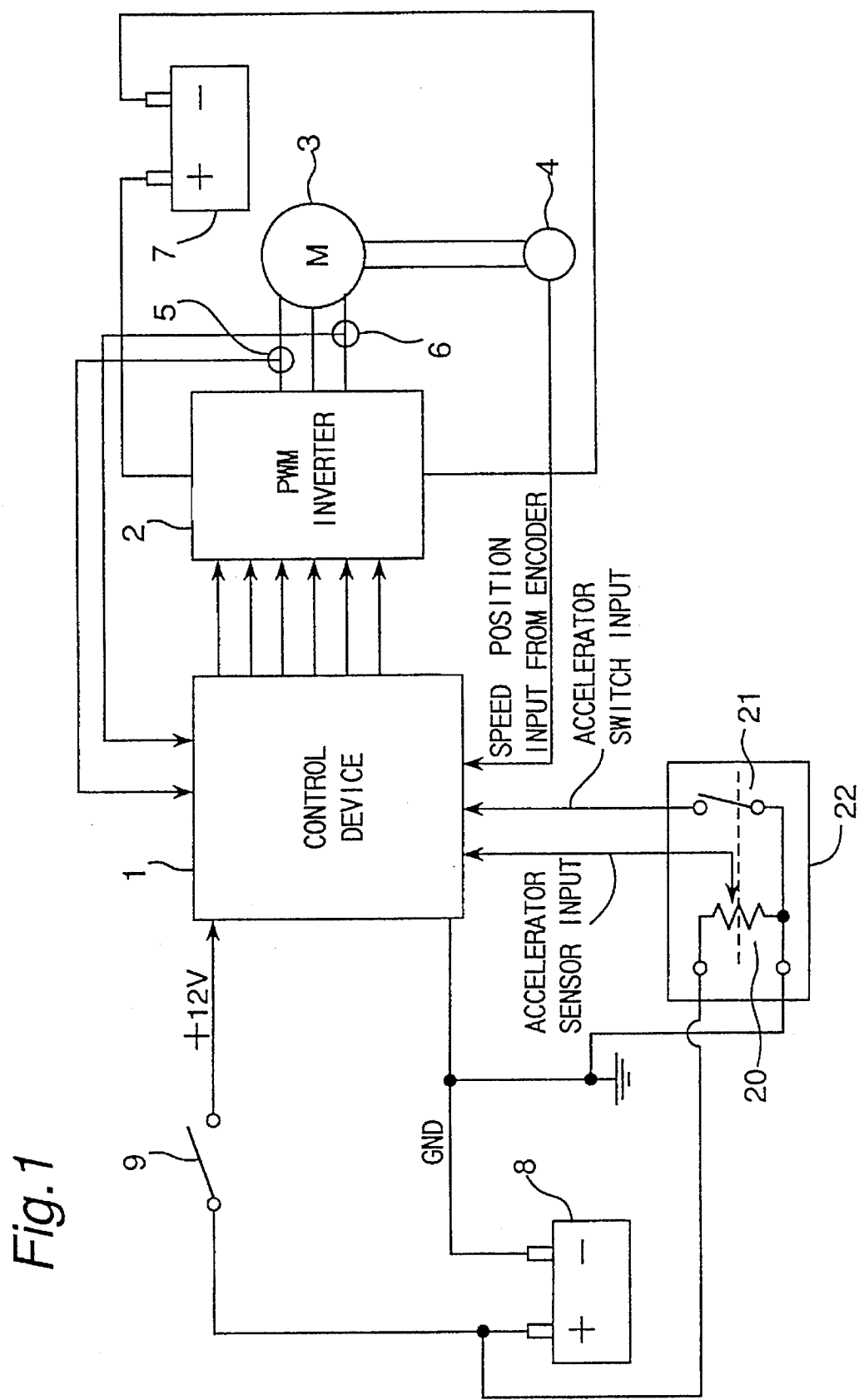
FIG. 1 is a circuit diagram of an electromobile having a protecting device according to one embodiment of the present invention.

Before the description of the present invention proceeds, it is to be noted that like parts are designated by like reference numerals throughout the accompanying drawings.

A preferred embodiment of the present invention will be described hereinbelow with reference to the drawings.

FIG. 1 shows a circuit diagram of an electromobile provided with a protecting device of one embodiment of the present invention.

Figure 4:
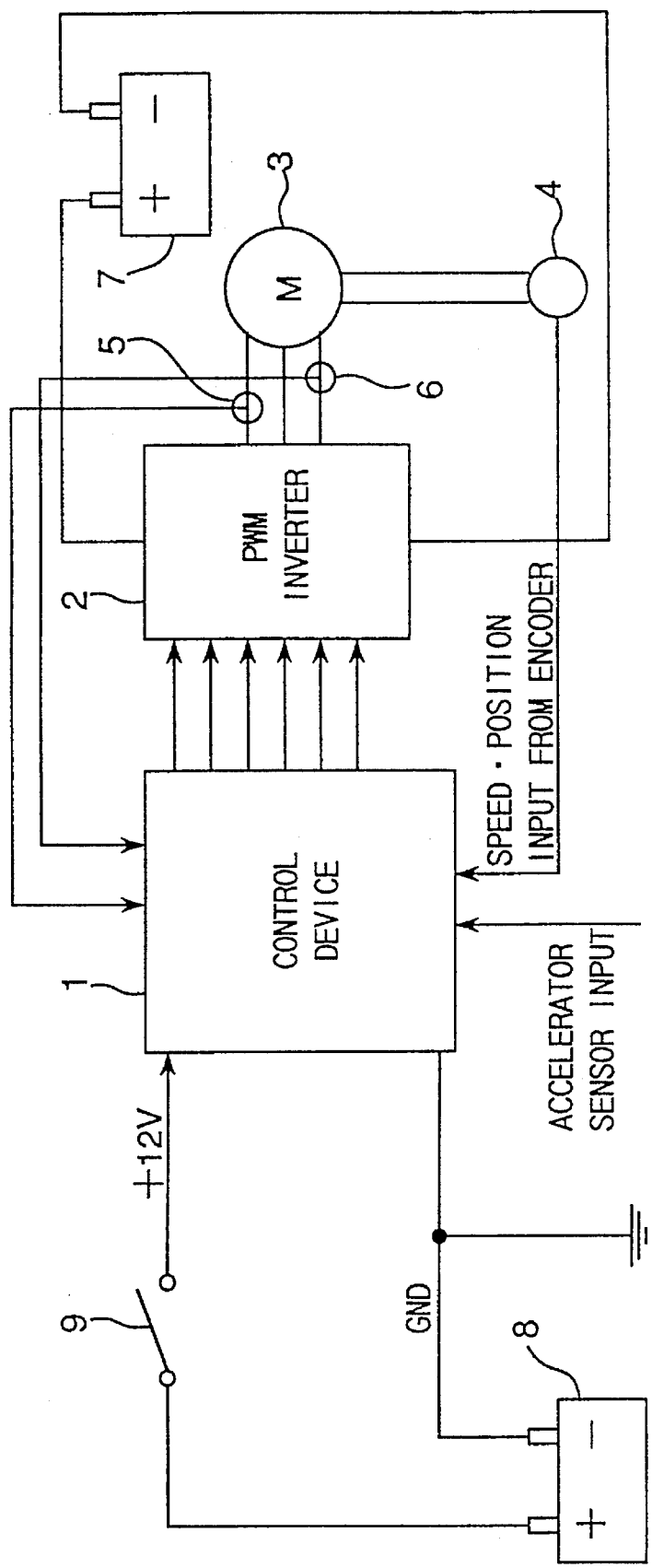
FIG. 4 is a circuit diagram of an example of an electromobile.
Figure 5:
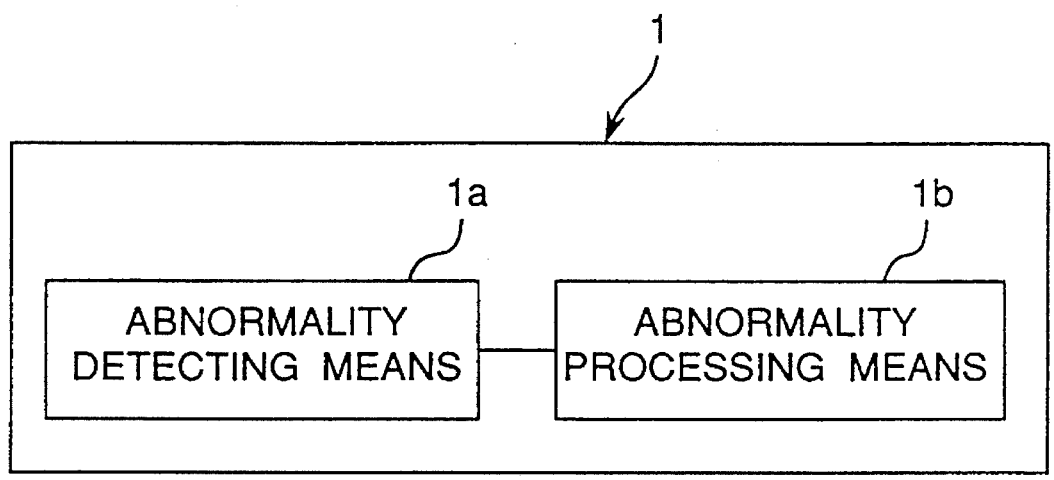
FIG. 5 is a block diagram of the construction of the control device in the protecting device.

As shown in FIG. 1, a protecting device of the invention protects an electromobile having a control device 1 which, receiving inputs of a speed command signal outputted from an accelerator sensor 20 of an accelerator unit 22 and a signal of the present rotating speed of a motor 3 which is a signal outputted from an encoder 4 and processed, calculates a torque command current corresponding to the difference between the inputs to thereby control the motor 3 in accordance with the calculated torque command current. The protecting device is provided with an accelerator switch 21 of the accelerator unit 22 changing the outputting state depending on the presence/absence of the generation of a speed command signal. Moreover, as shown in FIG. 5, the protecting device further includes, within the control device 1, an abnormality detecting means 1a for detecting the abnormal state in which the torque command current shows a value to rotate the motor 3 forward when an output signal from the accelerator switch 21 indicates that a speed command signal is not generated and the motor 3 is within a predetermined range of speeds, and an abnormality processing means 1b for controlling the motor 3 to be safe, e.g., in a direction to be stopped in response to the output of the abnormality detecting means 1a. The remaining constitution is the same as in FIG. 4.

In the protecting device of the electromobile, a speed command signal which is the output signal from the accelerator sensor 20 interlocking with the accelerator pedal and an output signal of the accelerator switch 21 interlocking with the accelerator sensor 20 are inputted to the control device 1. On the other hand, a signal of the present rotating speed of the motor 3 is inputted to the control device 1 from the encoder 4. When a current to instruct the necessary torque is calculated from the difference between the speed command signal of the accelerator sensor 20 and the present speed signal of the motor, the level of the output signal of the accelerator switch 21 is compared with the value of the torque command current calculated by the control device 1 to thereby detect an abnormality, whereby the motor 3 is controlled to be safe, specifically, the control of the motor 3 is stopped and the supply of electricity to the motor 3 is stopped.

Now, a method to detect an abnormality will be depicted.

Figure 2:
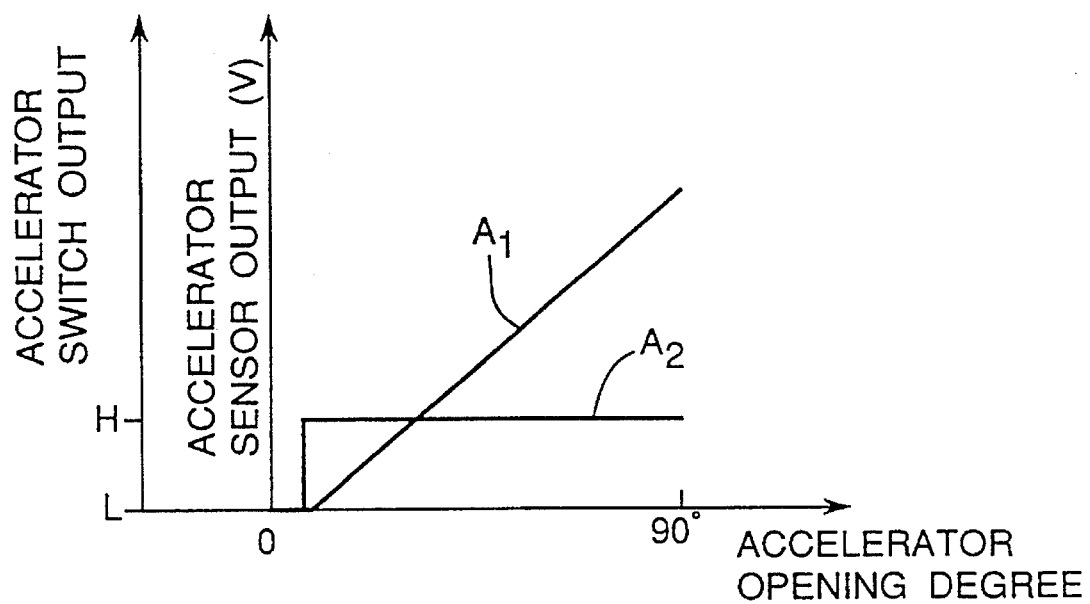
FIG. 2 is a characteristic diagram showing the relationship of the opening degree of an accelerator, outputs of an accelerator sensor, and outputs of an accelerator switch.

FIG. 2 represents the relationship of the opening degree of the accelerator and outputs of the accelerator sensor 20 and the accelerator switch 21. In FIG. 2, a solid line $A_1$ shows the characteristic of the opening degree of the accelerator to the output of the accelerator sensor 20, and a solid line $A_2$ is the characteristic of the output of the accelerator sensor 20 to that of the accelerator switch 21.

Referring to FIG. 2, in the state where the accelerator pedal is released (the opening degree of the accelerator is 0°), the output of the accelerator sensor 20 is 0 and the accelerator switch 21 generates an "L" output, i.e., low level output. On the contrary, if the accelerator pedal is stepped on (the opening degree of the accelerator is 90°), the output of the accelerator sensor 20 becomes maximum and that of the accelerator switch 21 is "H", i.e., high level output. An offset is provided to avoid an erroneous operation caused by noises or the like in the early step-on stage of the accelerator pedal.

Since the accelerator sensor 20 is mechanically interlocked with the accelerator switch 21 as is clearly shown in FIGS. 1 and 2, the level of the accelerator switch 21 is always in the "H" level when the output of the accelerator sensor 20 is present. Needless to say, an abnormality is detected if the aforementioned condition is not met.

Supposing that the accelerator sensor output is a speed command $\omega^*$ and the present speed of the motor 3 is $\omega_m$, the necessary torque current $I_q$ is calculated, for example, according to the following equation:

$$I_q = G(\omega^* - \omega_m)$$

wherein G is a constant of proportion.

To detect an abnormality, the torque command current is monitored when the accelerator sensor output is 0, i.e., the accelerator switch output is in the "L" level (actually, only the output level of the accelerator switch 21 is monitored since the accelerator sensor 20 interlocks with the accelerator switch 21).

When the output level of the accelerator switch 21 is "L" since $\omega^*=0$, there are three patterns of the torque command current $I^*_q$ as follows:

(1) when $\omega_m=0$ (the motor is stopped), $I^*_q=0$
(2) when $\omega_m>0$ (the motor is rotated forward), $I^*_q<0$
(3) when $\omega_m<0$ (the motor is rotated backward), $I^*_q>0$ In a system wherein the motor 3 driving the electromobile is rotated only in one direction and gears are shifted to move the electromobile backward, the rotation of the motor is carried out in the forward direction, that is, $\omega_m \geq 0$ is satisfied.

However, the motor may rotate backwards in some cases, for example, when the electromobile descends slowly on a slope, etc. Since this state is not abnormal, the protecting device is so arranged as to detect an abnormality from the value of the torque command current $I^*_q$ calculated from the rotating direction and the rotating speed of the motor 3 when the accelerator switch output is in the "L" level.

Figure 3:
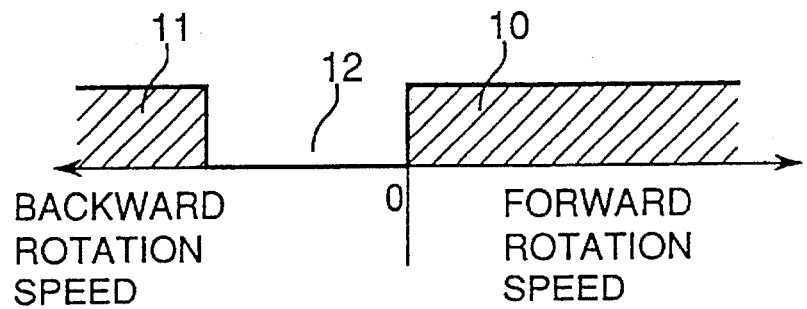
FIG. 3 is a schematic diagram of the speed range for detection of an abnormality.

In other words if $I_q>0$ is held when the accelerator switch output is in the "L" level in sections of FIG. 3 (in the speed range indicated by oblique lines), it is detected as abnormal, whereby the electromobile is controlled to be safe. More specifically, the control of the motor is stopped and the supply of electricity to the motor is stopped. In FIG. 3, a negative speed section 12 between the sections (a forward rotation section 10 and a backward rotation section 11) marked by oblique lines indicates where the motor rotates at low speeds, e.g., when the electromobile descends on a slope. Since this section 12 is not an abnormal region, the safety control is not executed. For example, when the negative speed section 12 is set from zero to a predetermined negative value, the predetermined negative value is 100 rpm.

In the foregoing description, only the proportionals are used to obtain the torque command current. However, the same effect as above is achievable from PI control, PID control, etc.

According to the protecting device of the electromobile, When the torque command current reaches a value to rotate motor and is supplied to the motor, that is, an abnormal condition is brought about even though the output signal of the accelerator switch 21 indicates that a speed command signal is not generated and the motor is kept in a predetermined range of speeds, the motor is controlled to be safe.

Moreover, according to the protecting device of the electromobile, when the motor slowly rotates backward, it is not an abnormal state in which the torque command current is a value to rotate the motor forward, and therefore the safety control is not performed and the motor is continuously retained in the originally controlled state.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A protecting device for protecting an electromobile having a control device, the control device receiving as inputs a speed command signal outputted from an accelerator sensor and a present motor speed signal outputted from an encoder, and calculating a torque command current corresponding to a difference between the inputs to thereby control a motor in accordance with the torque command current, said protecting device comprising:

an accelerator switch for generating an output signal which switches states depending on a presence/absence of the speed command signal outputted from the accelerator sensor;

an abnormality detecting means for detecting an abnormal state in which the torque command current assumes a value to rotate the motor while the output signal of said accelerator switch indicates that the speed command signal is absent; and an abnormality processing means for controlling the motor for a safe operation in response to the detection of the abnormal state by said abnormality detecting means.

2. The protecting device as claimed in claim 1, wherein a speed range of the motor has a forward rotation section, zero, and a backward rotation section, and wherein said abnormality detecting means detects an abnormality in the forward rotation section, zero, and the backward rotation section except for a portion of the backward rotation section extending from zero to a predetermined negative value.

3. A protecting device as claimed in claim 2, wherein said abnormality detecting means and said abnormality processing means are contained within the control device of the electromobile.

4. A protecting device as claimed in claim 1, wherein said abnormality detecting means and said abnormality processing means are contained within the control device of the electromobile.

* * * * *